United States Patent
Do (10) Patent No.: US 7,801,493 B2
(45) Date of Patent: Sep. 21, 2010

(54) QUASI-CIRCULATOR FOR ANTENNA MULTI-COUPLER SYSTEM

(75) Inventor: Ky-Hien Do, Kihei, HI (US)

(73) Assignee: Trex Enterprises Corp., San Diego, CA (US)

( * ) Notice: Subject to any disclaimer, the term of this patent is extended or adjusted under 35 U.S.C. 154(b) by 783 days.

(21) Appl. No.: 11/603,582

(22) Filed: Nov. 22, 2006

(65) Prior Publication Data

US 2007/0117524 A1    May 24, 2007

Related U.S. Application Data

(60) Provisional application No. 60/739,253, filed on Nov. 23, 2005, provisional application No. 60/779,791, filed on Mar. 3, 2006.

(51) Int. Cl.
*H04B 1/44* (2006.01)
(52) U.S. Cl. ............... 455/83; 455/107; 455/248.2; 375/219; 343/700 R
(58) Field of Classification Search ............. 455/78, 455/83, 107, 248.2; 375/219; 343/700 R
See application file for complete search history.

(56) References Cited

U.S. PATENT DOCUMENTS 3,781,684 A * 12/1973 Inslerman ............... 455/11.1
2005/0221875 A1 * 10/2005 Grossman et al. ........ 455/575.7
2006/0006950 A1 * 1/2006 Burns et al. ............... 330/311

OTHER PUBLICATIONS

Ahmed Gasmi, Noise and Power Optimization of a MMIC Quasi-Circulator, May 19, 1997, IEEE, IEEE Transactions on Microwave Theory and Techniques, vol. 45, No. 9, pp. 1572-1577.*

* cited by examiner

*Primary Examiner*—Nhan Le
(74) *Attorney, Agent, or Firm*—John R. Ross (57) ABSTRACT

A multi-coupler system for isolating radio signals in a transceiver, that includes a transmitter and a receiver, to permit simultaneous transmit by the transmitter and receive by the receiver through a single antenna in the exact same or nearby frequency ranges. This is done so that in-coming receive signals, transmitted from a remotely located radio, being detected by the receiver is much stronger than the portion of the transmit signal unintentionally coupled over by the co-site (or co-located) transmitter. The invention uses a special electronic circuit, termed the quasi-circulator, to couple the antenna to both the co-located receiver and the transmitter. The invention can also be used to couple several transceivers to a single antenna. The quasi-circulator circuit includes a simulated antenna load with an impedance matched to the antenna impedance. The circuit also includes a transformer with its primary side fed asymmetrically by the antenna so that it can pass the desired receive signal with minimum attenuation. The transformer's primary is on the other hand fed symmetrically from both sides by equally small portions of the transmit power from the co-site transmitter, but these signals are 180 degrees out of phase and cancel almost completely in the transformer.

9 Claims, 6 Drawing Sheets

FIG. 1

PRIOR ART

FIG. 2

PRIOR ART

QUASI-CIRCULATOR FOR ANTENNA MULTI-COUPLER SYSTEM

This application claims the benefit of U.S. Provisional Applications No. 60/739,253, filed Nov. 23, 2005 and No. 60/779,791 filed on Mar. 3, 2006.

This invention was made in the performance of a contract with the Office of Naval Research (Contract No. N00014-04-C-0477) and the United States Government has rights in the invention. This invention relates to radio systems and in particular radio systems having features to minimize radio interference.

BACKGROUND OF THE INVENTION

In many radio communications systems it is desirable to maintain continuous bi-directional data transfer (full duplex operation) between two stations. Cellular telephone systems and wireless computer networking systems are examples of two such systems. Currently, in these applications, maintaining the full duplex mode of operation requires that the telephone or radio modem transmit on one frequency range (or band) and receive on another frequency range. This technique is termed frequency diversity. For instance, a cellular telephone may operate in a frequency range around a nominal 800 MHz. That range may extend from about 790 MHz to 810 MHz. The particular telephone may transmit in the lower region of the 800 MHz frequency range (for example 792 MHz to 798) while simultaneously receiving in the upper region of the 800 MHz frequency range (for example 802 MHz to 808 MHz). The frequencies used are usually separated by adequate guard-band (in this example 798 MHz to 802 MHz) so that frequency-selective filters can be used to isolate the transmitter from the receiver while at the same time coupling both the transmitter and receiver to a common antenna. This approach is also known as frequency diplexing. Other techniques, such as the use of circulators, time diversity techniques, spread spectrum codes, or polarization selectivity, have also been employed to separate the transmit signals from the receive signals for full duplex operation, over a single antenna.

During full duplex operation it is crucial that the desired signal from the antenna that appears at the receiver input be stronger than the leakage signal from the transmitter (at the receiving frequency) that appears at the receiver input. For a typical 1-watt (+30 dBm) transmitter, and a received signal strength of −70 dBm at the antenna, the transmitter power at the receiver's frequency must be suppressed by at least 100 dB at the input to the receiver. This is usually achieved by requiring that transmitters have strict limitations on out-of-band emissions, by receiving in a frequency band isolated and separate from that of the transmitter, and by employing high gain antennas to boost the received signal power. If the transmitter power is not suppressed sufficiently at the receiver input, then the sensitivity of the receiver is deteriorated, even though operation may still be possible at some impractically high receive signal levels. Power levels at the receiver input from communication signals captured by the antenna are often in the range of −90 to −20 dBm, so insufficient suppression of the transmitter output will limit the useful range of the receiver and the distance over which full duplex radio communication may be established.

In military radios, due to the spread-spectrum coding and modulation schemes, the signals are spread over several octaves of bandwidth and are at power levels reaching hundreds of watts in CW. For example, the military SINC-GARDS radios operate in the 30-88 MHz range at a maximum output power of 50 W per radio. In a cluster of 4 radios, operating simultaneously on a vehicular platform, there exists a worst-case scenario, in which 1 radio is receiving and 3 radios are transmitting, that produces 150 W of transmitting power to interfere with the receiving radio. The issues of co-site interference here are prevalent and enormous. A solution to these co-site issues is the quasi-circulator.

Figure 1:
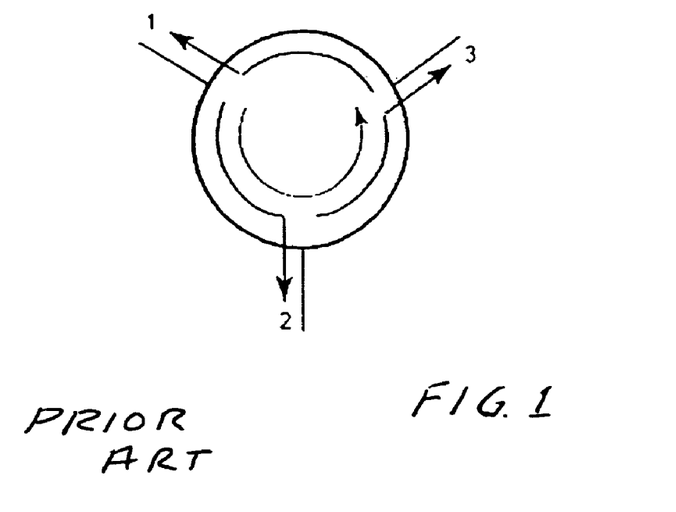
FIG. 1 shows a prior art circulator.
Figure 2:
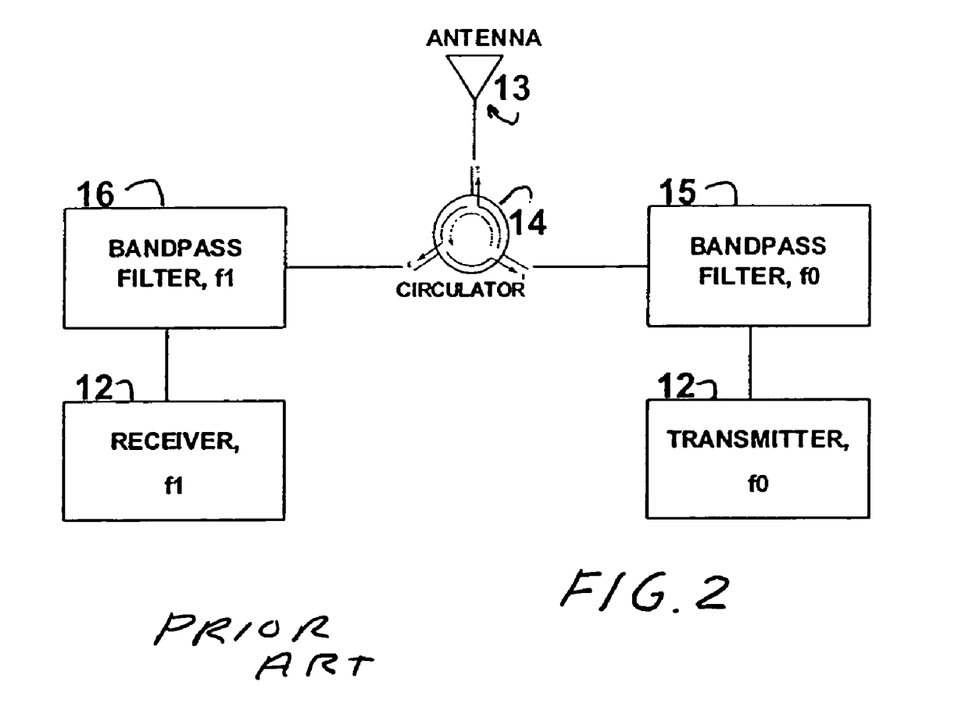
FIG. 2 shows a prior art circulator located in a transceiver system.

Circulators are known in the industry and provide a means of coupling both a transmitter and a receiver to a common antenna. A circulator is a three-port ferrite (magnetic) device that operates over some RF (radio frequency) bandwidth, and is illustrated schematically in FIG. 1. A circulator preferentially and circularly transfers power from Port 1 to Port 2, from Port 2 to Port 3, and from Port 3 to Port 1, hence the name. Power input to Port 1 of a circulator will appear mostly at Ports 2 and very little at Port 3. Typically, about 20 dB less of input power appears at Port 3. FIG. 2 shows Circulator 14 used to isolate a transmitter from a receiver, and to couple both to a common antenna. In this instance, the circulator provides 20 dB of isolation between the transmitter and receiver. 20 dB of isolation is usually insufficient to prevent power from the transmitter from interfering with a desired signal received from the antenna, so bandpass filters 15 and 16 are added to the transmit and receive signal paths, and frequencies of operation are chosen such that the transmitter signal passes through bandpass filter 15, but is blocked by bandpass filter 16, which in turn only passes the received signal from the Antenna 3. The use of bandpass filters 15 and 16 can suppress the transmitter power that enters the receiver by another 40 dB. This improves the isolation between transmitter and receiver to 60 dB, which is often enough to allow simultaneous transmission and reception of signals. This prior art implementation requires the use of widely separated frequencies for transmit and receive, to take advantage of the isolation provided by bandpass filtering. However, magnetic circulators are not available at all frequency ranges, especially at VLF, LF, HF, VHF and UHF band, and even if available they do not cover a wide bandwidth and can not handle high power.

Antenna polarization selectivity can be used to provide isolation between transmitter and receiver in a full duplex radio, but similar to the circulator approach described above, polarization selectivity usually provides only about 20 dB of isolation between the transmitter and the receiver. Systems which use polarization selectivity to isolate the transmitter and receiver usually also separate the frequencies of operation and employ band pass filtering on the transmitter output and receiver input to provide additional isolation.

Figure 3:
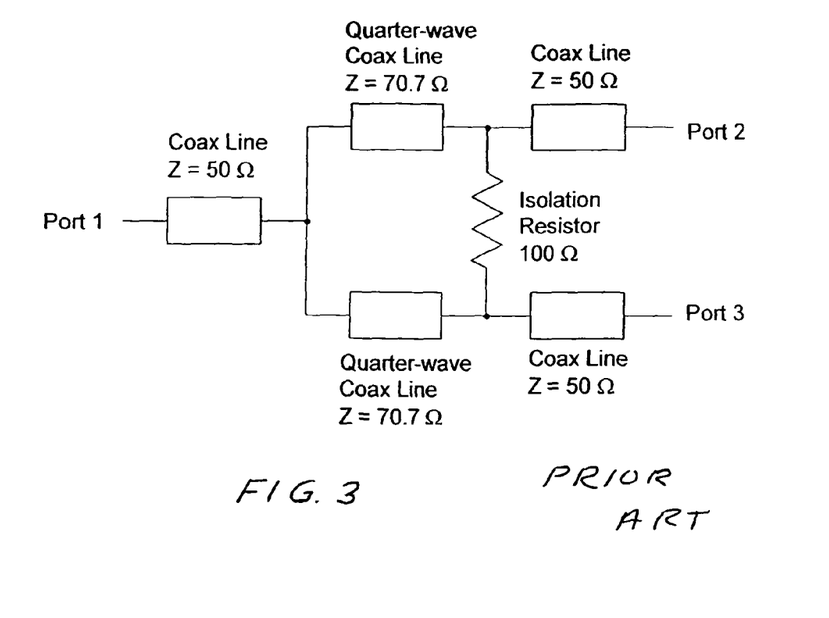
FIG. 3 shows features of a prior art Wilkinson divider.

FIG. 3 shows the circuit schematic of a Wilkinson divider. These dividers are sometime called "splitters". Radio power dividers of this type were described in a 1959 paper by Ernest J. Wilkinson. FIG. 3 shows features of a 3-port Wilkinson divider available from suppliers such as Werlatone with offices in Brewster N.Y. These devices can be used as a power splitters as well as power combiners.

Prior art patents describing techniques for providing isolation include U.S. Pat. No. 4,051,475, Radio Receiver Isolation System issued to Campbell; U.S. Pat. No. 4,174,506, Three-port lumped-element circulator comprising bypass conductor issued to Ogawa; and U.S. Pat. No. 4,704,588, Microstrip Circulator with Ferrite and Resonator in Printed Circuit Laminate issued to Kane. No prior art has been shown to adequately address co-site interference mitigation for a system in which multiple like radios are operated in a multi-octave band at very high power levels.

What is needed is a better system for providing radio isolation, in scenarios within which the problem of co-site interference is highly prevalent and harmful.

SUMMARY OF THE INVENTION

The present invention provides a multi-coupler system for isolating radio signals in a transceiver, that includes a transmitter and a receiver, to permit simultaneous transmit by the transmitter and receive by the receiver through a single antenna in the exact same or nearby frequency ranges. This is done so that in-coming receive signals, transmitted from a remotely located radio, being detected by the receiver is much stronger than the portion of the transmit signal unintentionally coupled over by the co-site (or co-located) transmitter. The invention uses a special electronic circuit, termed the quasi-circulator, to couple the antenna to both the co-located receiver and the transmitter. The invention can also be used to couple several transceivers to a single antenna. The quasi-circulator circuit includes a simulated antenna load with an impedance matched to the antenna impedance. The circuit also includes a transformer with its primary side fed asymmetrically by the antenna so that it can pass the desired receive signal with minimum attenuation. The transformer's primary is on the other hand fed symmetrically from both sides by equally small portions of the transmit power from the co-site transmitter, but these signals are 180 degrees out of phase and cancel almost completely in the transformer. The quasi-circulator works, in an unsymmetrical manner as far as the desired receive signal is concerned and in a symmetrical manner as far as the undesired co-site transmit signal is concerned, so that the receiver connected to the secondary side of the transformer receives the desired signal from the remote radio at a much higher sensitivity than it receives the leakage portion of the co-site transmit signal. Thus the invention provides a reduction in excess of 40 to 50 dB in the strength of the co-site transmitter signal at the receiver input, while leaving the signal captured by the antenna reduced by only 3 dB at the input to the receiver electronics.

DETAILED DESCRIPTION OF THE PREFERRED EMBODIMENT

Quasi-Circulator

Figure 4:
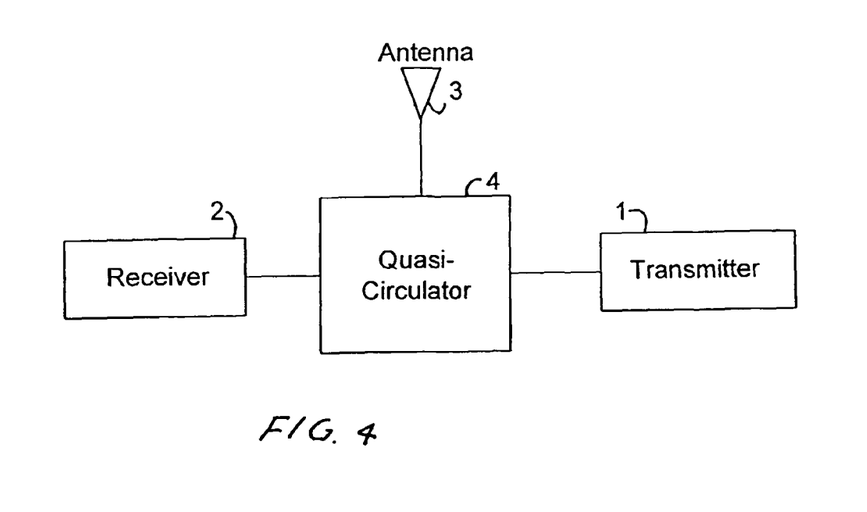
FIG. 4 is a block diagram showing features of the present invention.
Figure 5:
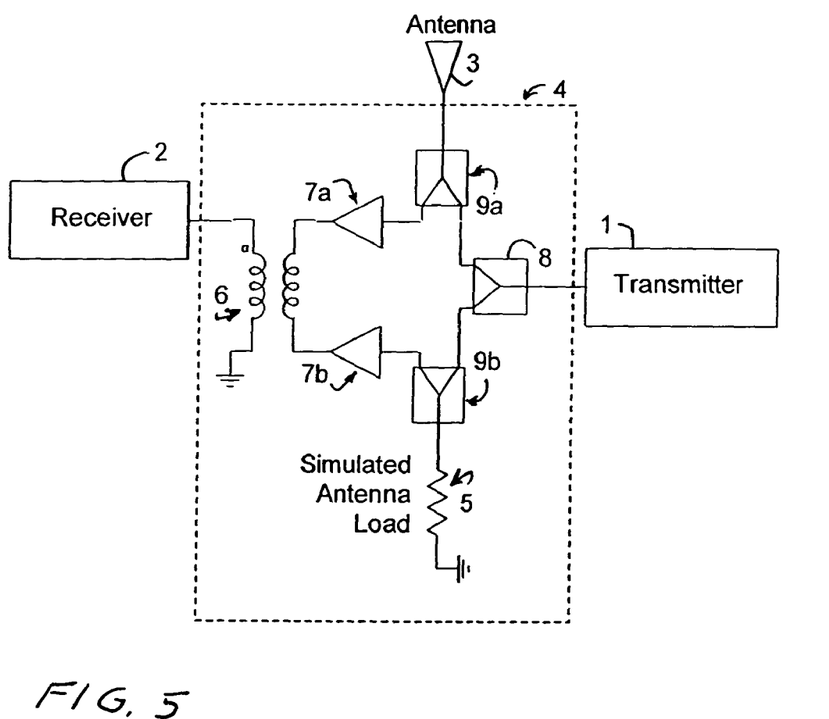
FIG. 5 shows more details of a preferred embodiment of the present invention.

A block diagram of a preferred embodiment of the present invention which Applicant refers to as a quasi-circulator is shown in FIG. 4. A detailed diagram of the FIG. 4 embodiment is shown in FIG. 5. The principal components of the system are: transmitter 1, receiver 2, antenna 3, and quasi-circulator 4. The principal components of quasi-circulator are: matched load 5, balun transformer 6, three 3 dB splitters 8, 9a and 9b and two 10 dB amplifiers 7a and 7b. Transmit radio signals from co-site transmitter 1 are divided equally by 3 dB splitter 8 into two paths, one leading to toward antenna 3 and one leading toward matched antenna load 5. Signals received by from antenna 3 are also equally divided by 3 dB splitter 9a into two paths, one leading toward matched load 5 and the other leading toward receiver 2. The signals from antenna 3 and co-site transmitter 1 circle in the quasi-circular to reach receiver 2 using different paths and are thus affected by the quasi-circulator favorably and non-favorably, respectively.

Wilkinson Divider

As shown in FIG. 5, three off-the-shelf three-port Wilkinson dividers 8, 9a and 9b are used as power splitters. Details of the Wilkinson divider are shown in FIG. 3. Each port of the Wilkinson divider is of 50-Ohm characteristic impedance. Port 1 is connected to Port 2 by a quarter-wave transmission-line transformer of 70.7-Ohm characteristic impedance. Port 1 is similarly connected to Port 3 by a quarter-wave transformer of 70.7-Ohm characteristic impedance. Port 2 and Port 3 are separated by an isolation resistor of 100-Ohms. When a signal enters Port 1, it will be split evenly between Port 2 and 3. The power levels at Port 2 and 3 are half (3 dB down) of the input power less by the insertion loss of the device. Typically, in practical implements of the Wilkinson divider, the power at Port 2 or 3 is 3.2 dB down from the input power at Port, with 0.2 dB being attributed to insertion loss. When a signal enters either Port 2 (or Port 3), half of the input power less the insertion loss appears at Port 1 and very little appears at Port 3 (or Port 2). Port 2 and Port 3 are thus isolated from one another. The isolation between Port 2 and Port 3 are due to the phasing effects of the two 70.7-Ohm quarter-wave transformers and 100-Ohm resistor. Intuitively, each quarter-wave section adds a 90 degree phase shift to the signal traveling along it. Two quarter-wave sections therefore insert a phase shift of 180 degrees. A signal traveling through the two quarter-wave sections thus cancels with its equal counterpart which in turn travels directly across the resistor. This cancellation causes the desired isolation effect in the Wilkinson divider. Typically, in practical implements of the Wilkinson divider, the isolation between Port 2 and 3 is in the order of 30 dB.

Circling Signals

Figure 6A:
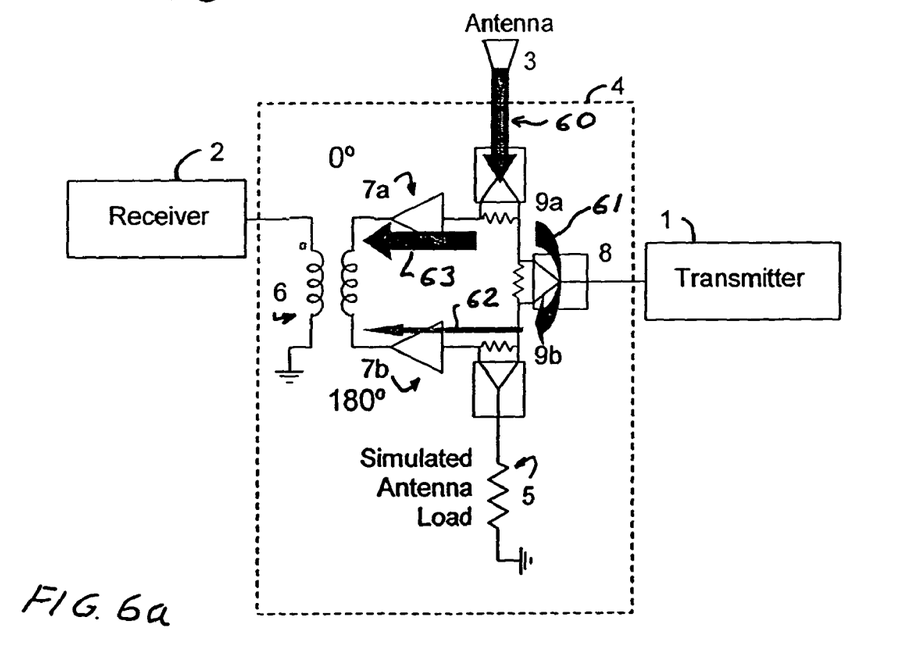
FIGS. 6a, 6b and 6c show how radio energy circulates in the preferred embodiment.

With reference to FIG. 6a, the captured energy from antenna 3 (arrow 60) passes through splitter 9a and almost one half appears at the left side of splitter 9a where it is amplified by low noise amplifier 7a and presented to the top of balun transformer 6. This is represented by the thick arrow 63 pointing from right to left, along the top path of FIG. 6a. Almost one half of the captured antenna energy appears at the right side of Splitter 9a and continues down the right side path through splitter 8 (arrow 61), splitter 9b, and low noise amplifier 7b (arrow 62), before finally reaching the bottom of balun transformer 6. By the time the power taking this right hand path reaches the bottom of balun transformer 6, it is much lower in magnitude (the reduction is estimated to be greater than 50 dB) than that taking the preferential left hand path through Splitter 9a to the top of balun transformer 6. The reduction in power of the signal along the bottom path is due to the isolations of the power dividers. The paths of these signals, originated from antenna 3, are not symmetrical thus allow the propagation of the received signal to the intended destination which is receiver 2. Since the two signals along the top and bottom path are greatly out of amplitude balance, there is only a 3 dB reduction in power of the received signal, captured at antenna 3, as it reaches receiver 2.

Co-Site Transmitter Power is Cancelled in Quasi-Circulator

Figure 6B:
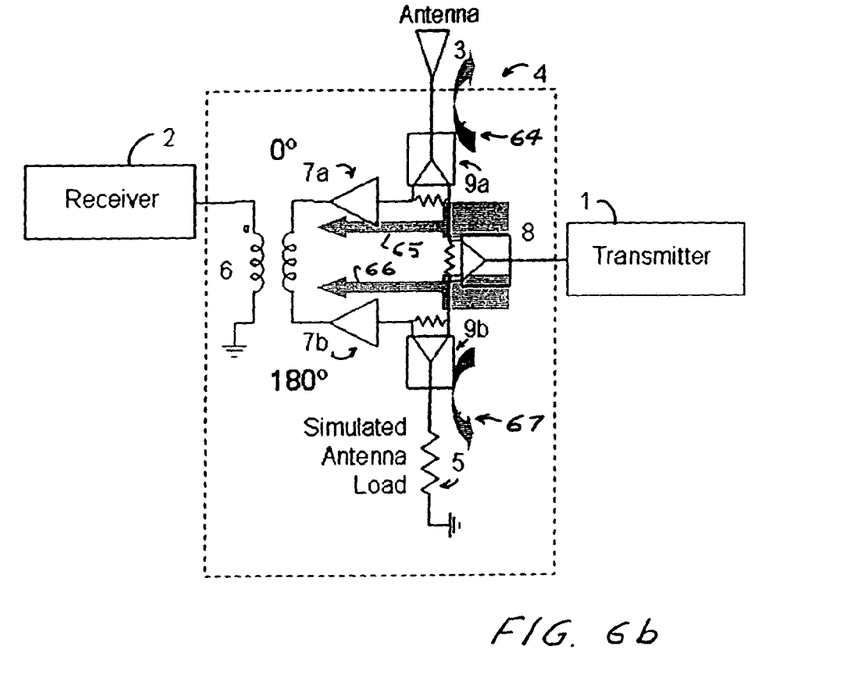

Similarly, as shown in FIG. 6b, the transmit power from transmitter 1 is divided equally by power divider 8, 9a and 9b between the radiating antenna 3 and the simulated antenna load 5. These are illustrated by the two arrows 64 and 67 pointing toward antenna 3 and simulated load 5 and 65 and 66 pointing from right to left, one along the top path and the other bottom path. The change in the arrow thickness of 65 and 66 visually illustrates the effect of reduction in leakage power due to the isolations of power divider 9a and 9b, although the drawings are not to scale. The amount of energy, that is not radiated into the air through Antenna 3 or absorbed by simulated antenna load 5 or absorbed in the isolation resistors of the Wilkinson splitters, travels to the left toward receiver 2. These two substantially equal signals, along the top path 65 and bottom path 66, are combined in balun transformer 6 with one side 180 degrees out of phase with the other. The differential ports of the balun transformer 6 thus cancel the energy from the two identically similar paths from the co-site transmitter 1 to receiver 2. Thus, with good phase and amplitude matching between the top path—from transmitter 1 to receiver 2 (containing Antenna 3)—and the bottom path—from transmitter 1 to receiver 2 (containing simulated antenna load 5), most of the co-site transmit energy that would otherwise leak over to the receiver is cancelled before it enters receiver 2, even though receiver 2 and transmitter 1 are physically allowed to share the same antenna.

Cancelling Unwanted Signals

Figure 6C:
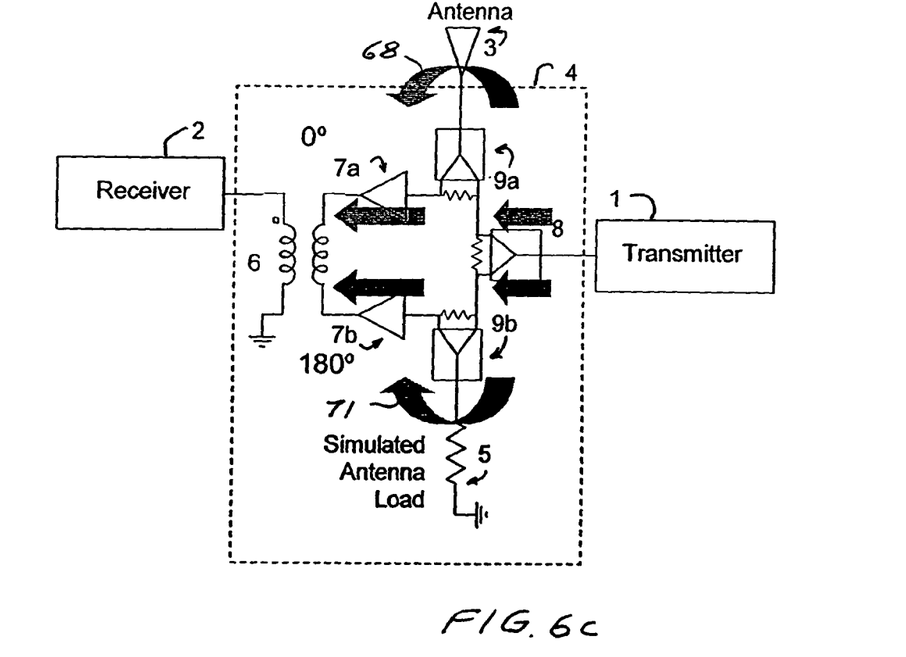

An additional benefit of the quasi-circulator is the return loss from antenna 3 mismatch, and any noise or harmonics introduced by amplifiers in transmitter 1 are also cancelled or substantially reduced before entering receiver 2. FIG. 6c illustrates how reflected energy (arrow 68) from Antenna 3 can be imitated by the use of simulated antenna load 5 (arrow 71) so that the reflection of the antenna can also be cancelled before it enters the receive radio. In the preferred embodiment, the simulated antenna load 5 is a static circuit which possesses the same reflection coefficient as that of the antenna. However, in other embodiments, simulated antenna load 5 can be a dynamically tunable circuit that imitates the operations of an antenna on the move or within a varying surrounding. The simulated antenna load 5 is therefore a powerful feature which allows an advantageous degree of freedom for dealing with practical environmental effects. This environment-mitigation feature is unique to the quasi-circulator and very powerful in breadth of applications.

In other words, the simulated antenna load 5 can be utilized to approximate the response of the antenna in both the static and dynamic senses. In the static sense, the matched load can be manufactured to offer the impedance response that is precisely that of the antenna, as measured within an anechoic chamber, over the frequency band of interest and at the rated power level. This configuration of the matched load is basic in nature and can be used in most common scenarios. However, when a communication system is intended for a mobile application, the platform upon which the antenna coupler and antenna are mounted operates dynamically. In the dynamic sense, the antenna radiation pattern and reflection are strong functions of the surroundings. Applicant envisions that in such cases, the matched load can be dynamically optimized by means of a calibration algorithm before each use. The calibration routine is a test sequence that can be devised to take into account the operational characteristics of the antenna along with the environmental effects of surroundings and circumstances. Once the calibration routine is exercised, the matched load can be considered to be the most optimized representation of the antenna under the circumstances of deployment, over the frequency band of interest and at the rated power level. The goal of the optimization routine is for maximum transmitter-to-receiver isolation. The means with which the matched load is to be optimized are resistor, inductors, capacitors and transmission lines that are variable in values, phases and characteristic impedances. These variable components are needed so that both the magnitude and phase of the impedance offered by the matched load are tunable.

Net Result

The net result is a reduction of the leakage from the co-site transmitter to the receiver by 40 to 50 dB or more, while reducing the desired received signals from the antenna to the receiver by only 3 dB. Since the signal emitted by transmitter 1 is split between antenna 3 and matched antenna load 5, by traversing through two power splitters, the transmitter power delivered to antenna 3 is reduced by 6 dB. In preferred embodiments the radios would be configured to simultaneously transmit and receiver voice and/or data over the exact same bandwidth. Quasi-circulator 4 operates on the concept of passive cancellation due to symmetry, hence is signal waveform independent. However, different spread spectrum codes and modulation techniques for the transmitted and the received signals may be employed to further enhance the isolation of the co-site transmit and receive signals beyond the 50 dB that is achieved by quasi-circulator 4.

Prototype with Off-the-Shelf Components

Figure 7:
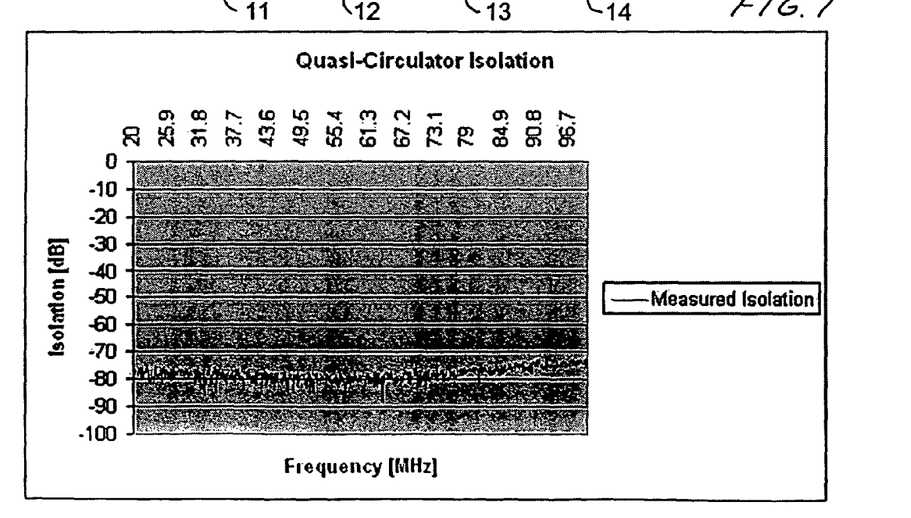
FIG. 7 shows test results showing isolation of more than 70 dB in an idealized situation.

The specific components used in the prototype referred to above are listed below. The prototype multi-coupler system includes a 200 W quasi-circulator that operates in the 30-88 MHz frequency range. Quasi-circulator 4 was built using splitters from Werlatone (Part No. D7105-10); a hybrid transformer from Wide Band Engineering (Part No. A65B 30-500); 50-ohm resistive load from JFW Industries (part No. 50T-242); and low noise amplifiers from Triquint (part No. TGA 2801). In this embodiment, the antenna of interest was the US Marine Corp OE-254 with an input impedance of 50-ohm. Therefore, the resistive load from JFW was an adequate matched load to emulate the antenna behavior. FIG. 7 shows the measured performance of the 200 W quasi-circulator, built for the 30-88 MHz range, when tested with two matched 50 ohm resistive loads, with one of the 50 ohm loads in the place of the antenna. In this test, the isolation is better than 70 dB. In practical applications, in which a real antenna are used, the isolation between transmit and receive paths is expected to be in the order of 50 dB realistically. Also, qualitative tests by Applicants with the prototype version of the present invention verified the functional performance of the quasi-circulator in the field. The prototype was tested using SINCGARS radios with the US Marines Corp., 3$^{rd}$ Marine Regiment, at Kaneohe Bay. Applicants were able to successfully receive a weak SINCGARS signal in the presence of three co-site SINCGARS transmitting signals, with each transmitter outputting at the 50 W power level. Applicants estimate that the isolation in these actual field conditions is in the range of 40 to 50 dB.

Multi-User Co-Site System

Figure 8:
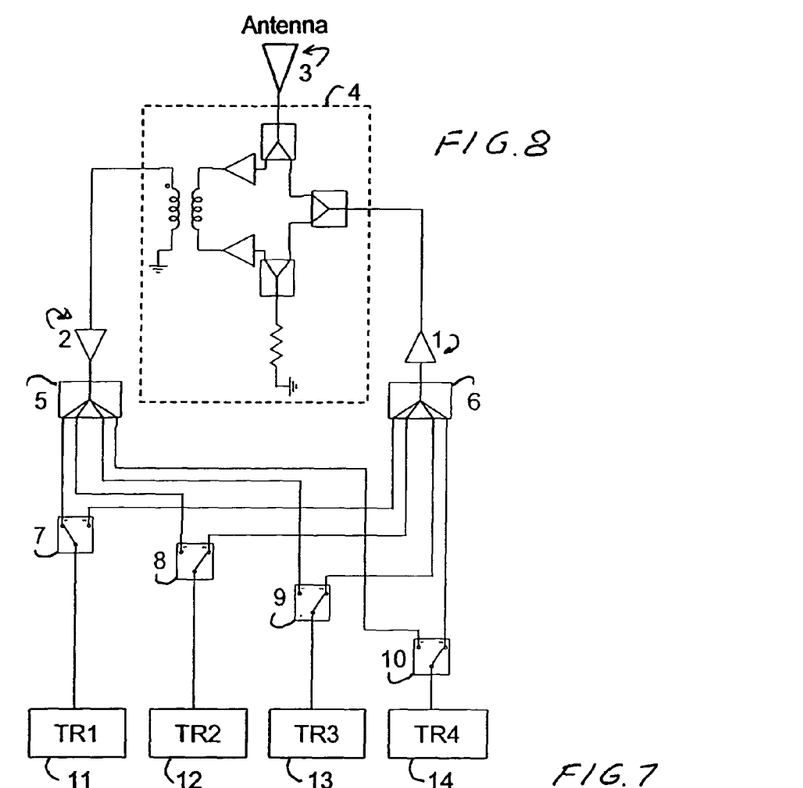
FIG. 8 shows a multi-transceiver embodiment.

FIG. 8 shows a deployment of quasi-circulator 4 in a multi-user co-site system, in which multiple transceivers namely TR1, TR2, TR3 and TR4 are attached to the same antenna 3 via switches, splitter/combiner and appropriate amplifiers. For instance, in FIG. 8, transceivers 12, 13 and 14 are toggled to the transmit mode through switches 8, 9 and 10, while transceiver 11 is toggled to the receive mode through switch 7. Normally, every transceiver rests in the receive mode and is keyed to the transmit mode when needed. All the transmitting transceivers are routed to antenna 3 through combiner 6, power amplifier 1 and quasi-circulator 4. All the receiving transceivers are routed from Antenna 3 through quasi-circulator 4, low noise amplifier 2 and splitter 5. In this configuration, quasi-circulator 4 is used to isolate the transmitting transceivers from their receiving counterparts. In our implementation for the 30-88 MHz frequency range, the 4-way divider was bought from Werlatone (Part No. D5920-10) and the switches were bought from Pulsar Microwave (part No. SW2AD-A33).

Modifications and Improvements

Those who are skilled in the art can reference the schematic diagram shown in FIG. 5 and use a variety of circuit elements to practice the present invention. Certain modifications and improvements will therefore occur to those skilled in the art upon reading the foregoing description. The embodiment described herein is based on a specific architecture but the present invention is not so limited, however.

Also, those are skilled in the art will recognize that the circuit elements as shown in FIG. 5 are conventional splitters, hybrid transformer, resistive load and low noise amplifiers which are commercially available through numerous suppliers. Therefore, those skilled in the art can readily realize the quasi-circulator by purchasing, and assembling these components, from companies such as Anaren, Filtran, M/A-COM, MCCI, Mini-circuits, or Werlatone. It must be noted that the catalog of companies listed here is not exhaustive by any means. It is included here to illustrate the fact that the components employed in the construction of the quasi-circulator are common and basic components which are widely available in the RF and microwave industry.

Figure 9:
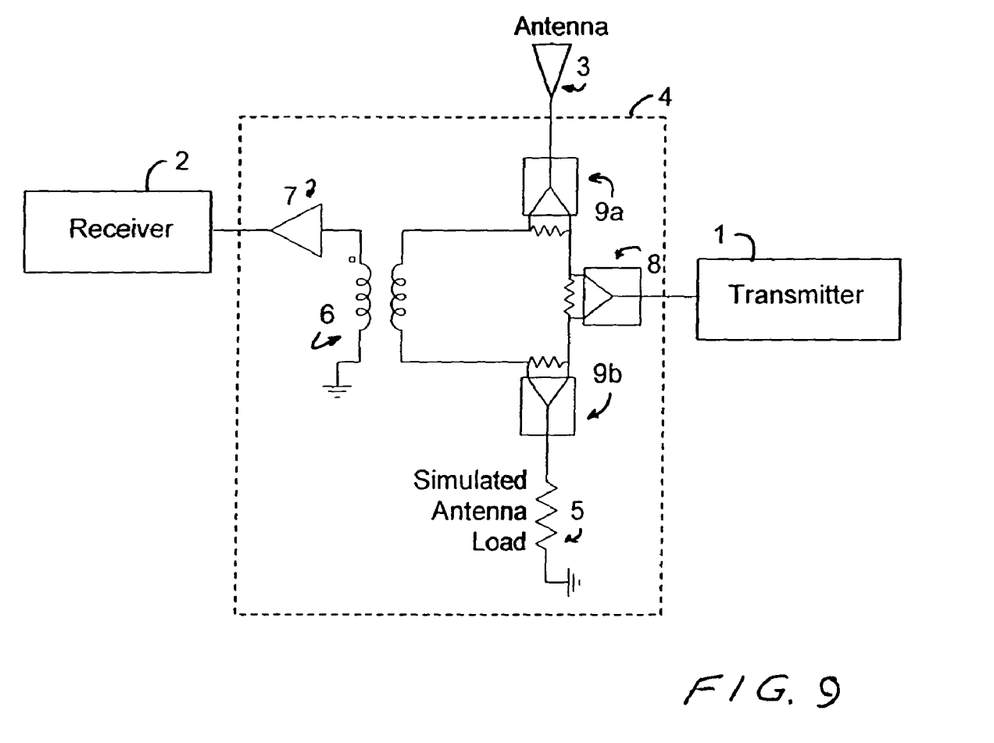
FIG. 9 shows an embodiment with high transmit power.

In applications where the transmit power is much greater than 200 W, a configuration as shown in FIG. 9 is more desirable. In FIG. 9, only one low-noise amplifier is used and it is situated on the secondary winding of the transformer. At such a location, the low noise amplifier will not be prematurely saturated by the transmitter leakage energy. However, the penalty of configuration in FIG. 9 is 6 dB loss along the receive path, instead of 3 dB, and 6 dB loss along the transmit path.

Certain other modifications and improvements will therefore occur to those skilled in the art upon reading the foregoing description. The embodiment described herein is based on a specific architecture but the present invention is not so limited. As indicated above the present invention can be utilized with other well-known radio isolation techniques. It should be noted that the catalog of companies listed here is not exhaustive by any means. It is included here to illustrate the fact that the components employed in the construction of the quasi-circulator are common and basic components which are widely available in the radio frequency and microwave industry. The techniques can also be applied to produce jamming devices to jam other radios while leaving a receiver isolated from the jamming noise. So the scope of the invention should be determined by the appended claims and their legal equivalence.

What is claimed is:

1. A radio multi-coupler system, which connects multiple transceivers to a single antenna, for isolating one or more receivers from co-located transmitter radio signals in a radio frequency range so that radio signal can be simultaneously transmitted from and received through a single antenna, said radio multi-coupler system comprising:

A) at least one transmitter,
B) a single antenna, defining an antenna electrical impedance within said radio frequency range,
C) a quasi-circulator comprising:
  1) a matched electrical load having an electrical impedance substantially matched to said antenna electrical impedance,
  2) three radio signal splitters adapted to split incoming radio power signals into two substantially equal outgoing radio power signals, and
  3) a transformer defining a primary and a secondary coil, wherein the three radio signal splitters and said transformer are arranged produce:
    (i) a circulation within said quasi-circulator of about one-half of output power of said co-located transmitter in a first direction and a circulation of about one-half of said output power of said co-located transmitter in a second direction opposite said first direction and
    (ii) a circulation within said quasi-circulator of about one-half of input power received by said antenna in said first direction and a circulation of one-half of said input power received by said antenna said second direction;
  with said transformer positioned within said quasi-circulator so that substantially all output power of said transmitter that is not otherwise transmitted or dissipated is cancelled in said transformer, and
D) at least one receiver adapted to receive remote radio power signals at a output of said secondary coil of said transformer, wherein said remote radio power signals received by said receiver is significantly greater than radio power signals received by said receiver from said co-located transmitter.

2. The radio multi-coupler system as in claim 1 wherein said quasi-circulator also comprises two radio signal amplifiers for amplifying radio signals at two inputs to the primary side of said transformer.

3. The radio multi-coupler system as in claim 1 and further comprising a radio signal amplifier positioned to amplify output signals from said secondary side of said transformer.

4. The radio multi-coupler system as in claim 1 wherein said three radio signal splitters are Wilkinson dividers.

5. The radio multi-coupler system as in claim 4 wherein each of said Wilkinson dividers is a three-port divider with each port having a 50-Ohm characteristic impedance and each divider having a port connected to two other ports with a quarter-wave transmission line transformer of about 70.7 Ohm characteristic impedance, wherein the other two ports are separated by an isolation resister with an impedance of about 100 Ohms.

6. The radio multi-coupler system as in claim 1 wherein said transformer is a balun transformer.

7. The radio multi-coupler system as in claim 6 wherein one of two secondary terminals of said transformer is grounded.

8. The radio multi-coupler system as in claim 1 wherein multiple transceivers are connected to a single transmitter.

9. The radio multi-coupler system as in claim 1 wherein each of said transceivers are routed from the single antenna through the quasi-circulator through a low noise amplifier and a splitter.

* * * * *